(12) United States Patent
Kozhisseri et al.

(10) Patent No.: US 11,526,334 B2
(45) Date of Patent: Dec. 13, 2022

(54) METHOD AND SYSTEM FOR DYNAMICALLY GENERATING EXECUTABLE SOURCE CODES FOR APPLICATIONS

(71) Applicant: Wipro Limited, Bangalore (IN)

(72) Inventors: Prajeesh Chandran Kozhisseri, Bangalore (IN); Ganesh Narayan, Bangalore (IN); Srinivas Abhinav Raj, Bengaluru (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/162,100

(22) Filed: Jan. 29, 2021

(65) Prior Publication Data

US 2022/0188079 A1  Jun. 16, 2022

(30) Foreign Application Priority Data

Dec. 11, 2020 (IN) .............................. 202041054061

(51) Int. Cl.
*G06F 8/35* (2018.01)
*G06N 5/04* (2006.01)
(Continued)

(52) U.S. Cl.
CPC .................. *G06F 8/35* (2013.01); *G06F 8/42* (2013.01); *G06N 5/04* (2013.01); *G06N 20/00* (2019.01)

(58) Field of Classification Search
CPC .. G06F 8/35; G06F 8/42; G06N 20/00; G06N 5/04
See application file for complete search history.

(56) References Cited

U.S. PATENT DOCUMENTS 10,684,940 B1 * 6/2020 Kayal ................... G06F 11/368
10,691,514 B2    6/2020 Mcclory et al.
(Continued)

OTHER PUBLICATIONS

Daniel Tarlow, "Bimodal Modelling of Source Code and Natural Language" Proceedings of the 32nd International Conference on Machine Learning, PMLR 37:2123-2132, 2015. (Year: 2015).*
(Continued)

*Primary Examiner* — Qing Chen
*Assistant Examiner* — Amir Soltanzadeh
(74) *Attorney, Agent, or Firm* — Finnegan, Henderson, Farabow, Garrett & Dunner, LLP (57) ABSTRACT

Disclosed herein is a method and a source code generator for dynamically generating an executable source code for an application. Initially, user inputs related to requirements of an application are received from a user. Subsequently, an application flow corresponding to the application is identified and one or more source codes for the application flow are generated using at least one pre-trained code generation model. Further, one or more best-fit source codes for the application are determined based on similarities among each of the one or more source codes. Finally, the executable source code for the application is generated by validating the one or more best-fit source codes based on historical information related to the one or more executable source codes previously generated by the source code generator. In an embodiment, the present disclosure helps to reduce turn-around time and manual efforts required for developing an application.

18 Claims, 6 Drawing Sheets

(51) Int. Cl.
*G06N 20/00* (2019.01)
*G06F 8/41* (2018.01)

(56) References Cited

U.S. PATENT DOCUMENTS

| | | | |
|---|---|---|---|
| 2013/0007700 A1* | 1/2013 | Villar | G06F 8/33 |
| | | | 717/109 |
| 2016/0062876 A1* | 3/2016 | Narayanan | G06N 5/022 |
| | | | 717/124 |
| 2017/0102925 A1 | 4/2017 | Ali et al. | |
| 2017/0220327 A1* | 8/2017 | Allen | G06F 40/205 |
| 2019/0391904 A1* | 12/2019 | Sabharwal | G06N 3/0445 |
| 2020/0057612 A1* | 2/2020 | Doyle | G06F 8/35 |
| 2020/0293291 A1 | 9/2020 | Guan | |
| 2021/0157553 A1* | 5/2021 | Ligman | G06F 8/73 |
| 2022/0012018 A1* | 1/2022 | Trim | G06N 20/00 |

OTHER PUBLICATIONS

Allamanis, M, et al., Bimodal Modelling of Source Code and Natural Language. in FR Bach & DM Blei (eds), Proceedings of the 32nd International Conference on Machine Learning, ICML 2015, Lille, France, Jul. 6-11, 2015. vol. 37, JMLR Proceedings, vol. 37, Journal of Machine Learning Research: Workshop and Conference Proceedings, Lille, France, pp. 2123-2132, International Conference on Machine Learning (ICML 2015), Lille, France, Jul. 7, 2015. (11 pages).

* cited by examiner

METHOD AND SYSTEM FOR DYNAMICALLY GENERATING EXECUTABLE SOURCE CODES FOR APPLICATIONS

TECHNICAL FIELD

The present subject matter is, in general, related to software development and more particularly, but not exclusively, to a method and system for dynamically generating an executable source code for a software.

BACKGROUND

Presently, it takes a lot of time for developers and architects to generate a code required to solve a problem. Various aspects like, level of skill and technology expertise of the developers, contribute to the time required for generating the code. Most often, it is seen that, within an organization, the developers tend to write the same code or functionality repetitively, resulting in a lot of duplication of work which is time consuming. In principle, the developers do not have an efficient mechanism to access the previously generated source code. Additionally, the developers lack sophisticated techniques or tools to access multiple websites or source code repositories to perform curation of content while generating the code.

With the advent of open repositories like GitHub®, enterprise repositories like GitLab® and availability of code snippets across multiple public domains, the developers are leveraging these platforms to easily generate a simple function or a code snippet. The same logic may be implemented for generating application templates based on customer requirements and, can be further extended to generate an entire project or an application from a group of code snippets, functions and/or microservices. This process can be made efficient with the use of Artificial Intelligence and Natural Language Processing, which may be leveraged to obtain a working application from large datasets of codes available in various code repositories stated above.

However, the existing Artificial Intelligence based solutions offer only a limited functionality and do not cater to complex functionalities, business logics and backend requirements. Consequently, lot of developers still need to be on-boarded to monitor and complete the process based on their technological skills. Thus, the existing solutions cannot be used for generating a curated working application based on the application requirements.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of dynamically generating an executable source code for an application. The method comprises receiving user inputs related to requirements of an application from a user and identifying an application flow corresponding to the application by processing the user inputs. Further, the method comprises generating one or more source codes for the application flow using at least one pre-trained code generation model. The at least one pre-trained code generation model generates the one or more source codes based on the user inputs, and one or more reference source codes retrieved from predetermined code repositories. Upon generating the one or more source codes, the method comprises determining one or more best-fit source codes for the application based on similarities among each of the one or more source codes. Finally, the method comprises generating an executable source code for the application by validating the one or more best-fit source codes based on historical information related to one or more executable source codes previously generated by the source code generator.

Further, the present disclosure relates to a source code generator for dynamically generating an executable source code for an application. The source code generator comprises a processor and a memory. The memory is communicatively coupled to the processor and stores processor-executable instructions, which on execution, cause the processor to receive user inputs related to requirements of an application from a user. Further, the instructions cause the processor to identify an application flow corresponding to the application by processing the user inputs. Subsequently, the instructions cause the processor to generate one or more source codes for the application flow using at least one pre-trained code generation model. The at least one pre-trained code generation model generates the one or more source codes based on the user inputs, and one or more reference source codes retrieved from predetermined code repositories. Further, the instructions cause the processor to determine one or more best-fit source codes for the application based on similarities among each of the one or more source codes. Finally, the instructions cause the processor to generate an executable source code for the application by validating the one or more best-fit source codes based on historical information related to one or more executable source codes previously generated by the source code generator.

Furthermore, the present disclosure relates to a non-transitory computer readable medium including instructions stored thereon that when processed by at least one processor cause a source code generator to perform operations comprising dynamically generating an executable source code for an application. Initially, the instructions cause the source code generator to receive user inputs related to requirements of an application from a user. Further, the instructions cause the source code generator to identify an application flow corresponding to the application by processing the user inputs. Subsequently, the instructions cause the source code generator to generate one or more source codes for the application flow using at least one pre-trained code generation model. The at least one pre-trained code generation model generates the one or more source codes based on the user inputs, and one or more reference source codes retrieved from predetermined code repositories. Further, the instructions cause the source code generator to determine one or more best-fit source codes for the application based on similarities among each of the one or more source codes. Finally, the instructions cause the source code generator to generate an executable source code for the application by validating the one or more best-fit source codes based on historical information related to one or more executable source codes previously generated by the source code generator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a source code generator for generating an executable source code for an application. One of the objectives of the proposed method is to auto-generate one or more source codes required for developing a fully functional and/or working application based on application requirements of a user. According to the proposed method, the user may have a working application with high confidence levels, for example 80%-90%, which is generated automatically from the application requirements provided by the user.

Thus, the proposed method leverages Artificial Intelligence (AI) to generate codes required for developing an application with multiple technologies. That is, the proposed method automatically generates a working and/or an executable code for an application based on application requirements of the user, using a pre-trained neural network model.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
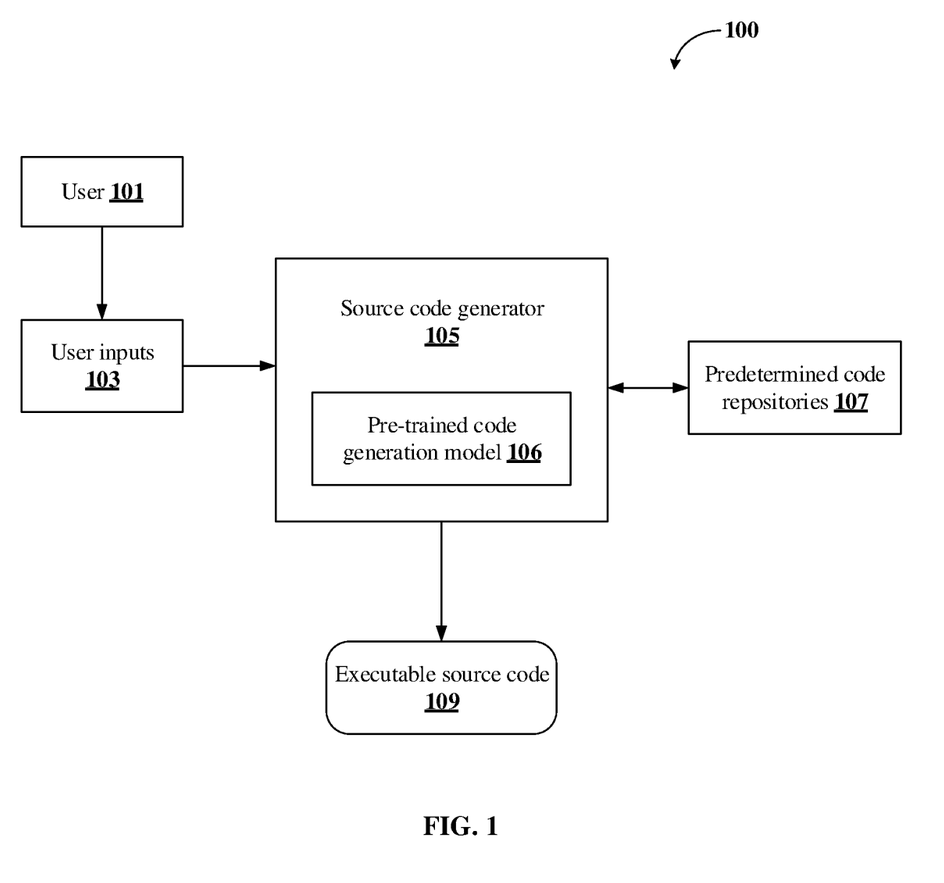
FIG. 1 illustrates an exemplary environment for dynamically generating an executable source code for an application in accordance with some embodiments of the present disclosure.

FIG. 1 illustrates an exemplary environment for dynamically generating an executable source code 109 for an application in accordance with some embodiments of the present disclosure.

In an embodiment, the environment 100 may include, without limiting to, a user 101, a source code generator 105 and predetermined code repositories 107. As an example, the environment 100 may represent an organization/enterprise comprising a team of developers working on developing applications based on various requirements of user 101 and/or clients of the organization. The user 101 may be a developer or a common end user of the application, who is aware of specific requirements of an application to be developed using the source code generator 105.

In an embodiment, the user 101 and the source code generator 105 may be within the same organization, and the user 101 may input the user requirements to the source code generator 105 using an user interface of the source code generator 105. In an alternative embodiment, the user 101 and the source code generator 105 may be in different environments and the source code generator 105 may receive the user inputs 103 over a preconfigured wired and/or wireless communication channel connecting the source code generator 105 with a user device associated with the user 101.

In an embodiment, the source code generator 105 may be a computing system such as, without limiting to, a desktop, a laptop, a server or a smartphone, which may be configured for generating an executable source code 109 for an application in accordance with various embodiments disclosed in the present disclosure. In an embodiment, the predetermined code repositories 107 may include one or more external as well as internal databases that store one or more source codes relating to a plurality of functions in a plurality of technologies or programming languages. The external databases may be the data repositories that are located external to the source code generator 105 and may include, without limiting to, websites, online portals and databases hosted on remote servers. Similarly, the internal databases may be the data repositories that are created and maintained within the same organization that hosts the source code generator 105. As an example, the internal databases may include proprietary code repositories of the organization, internal blogs and references. In general, the predetermined code repositories 107 may include, without limiting to, a public source code repository, a private source code repository, a public issue repository, a private issue repository, online information portals/websites or learning systems. In an embodiment, the source code generator 105 may connect with and retrieve the one or more source codes from the predetermined code repositories 107 using a preconfigured wired and/or wireless communication channel (not explicitly shown in FIG. 1).

In an embodiment, after receiving the user inputs 103 relating to specific requirements of the application from the user 101, the source code generator 105 may identify an application flow corresponding to the application by processing the user inputs 103. That is, the source code generator 105 may process and convert the user inputs 103, which are received in a plain spoken language, such as English, into machine-understandable encoded vector representations, for enabling the source code generator 105 to retrieve and/or generate one or more source codes required for the application.

In an embodiment, once the application flow is obtained, the source code generator 105 may generate the one or more source codes for the application flow using at least one of a pre-trained code generation model 106 configured in the source code generator 105. For example, the at least one pre-trained code generation model 106 may be the neural network models that are trained to comprehend the user inputs 103, dynamically refer to the predetermined code repositories 107 and generate the one or more source codes required for the application. The training and configuration of the at least one pre-trained code generation model 106 is explained in the further sections of the disclosure.

In an embodiment, after generating the one or more source codes, the source code generator 105 may determine one or more best-fit source codes for the application based on similarities among each of the one or more source codes. As an example, the one or more best-fit source codes may be the source codes that closely map with the application flow and meet the application requirements defined by the user 101. In an embodiment, the one or more source codes which are not found to be relevant to the requirements of the application, may be discarded before further processing of the one or more source codes.

In an embodiment, subsequent to determining the one or more best-fit source codes for the application, the source code generator 105 may generate an executable source code 109 for the application by validating the one or more best-fit source codes. Here, the validation of the one or more best-fit source codes may be performed based on historical information related to one or more executable source codes 109 previously generated by the source code generator 105. As an example, the historical information related to the one or more executable source codes 109 may include, without limitation, a user feedback on the one or more executable source codes 109. Particularly, the historical information may indicate whether the user 101 had accepted or not accepted the one or more source codes previously recommended to the user 101.

In an embodiment, the one or more best-fit source codes may be validated based on historical user feedback on the executable source code 109 generated from a selected one of the one or more best-fit source codes. That is, the source code generator 105 may validate the one or more best-fit source codes based on a logic that, when a source code is most often selected by users 101 for an application with similar requirements, it is most likely that the user 101 may select the same source code for the current application as well, when the application requirements defined by the user 101 are similar.

Thus, the source code generator 105 allows the user 101 to obtain a working and/or an executable source code 109 for the application by merely inputting specific requirements of the application. As a result, the source code generator 105 greatly reduces the time and manual efforts required for developing an application.

Figure 2:
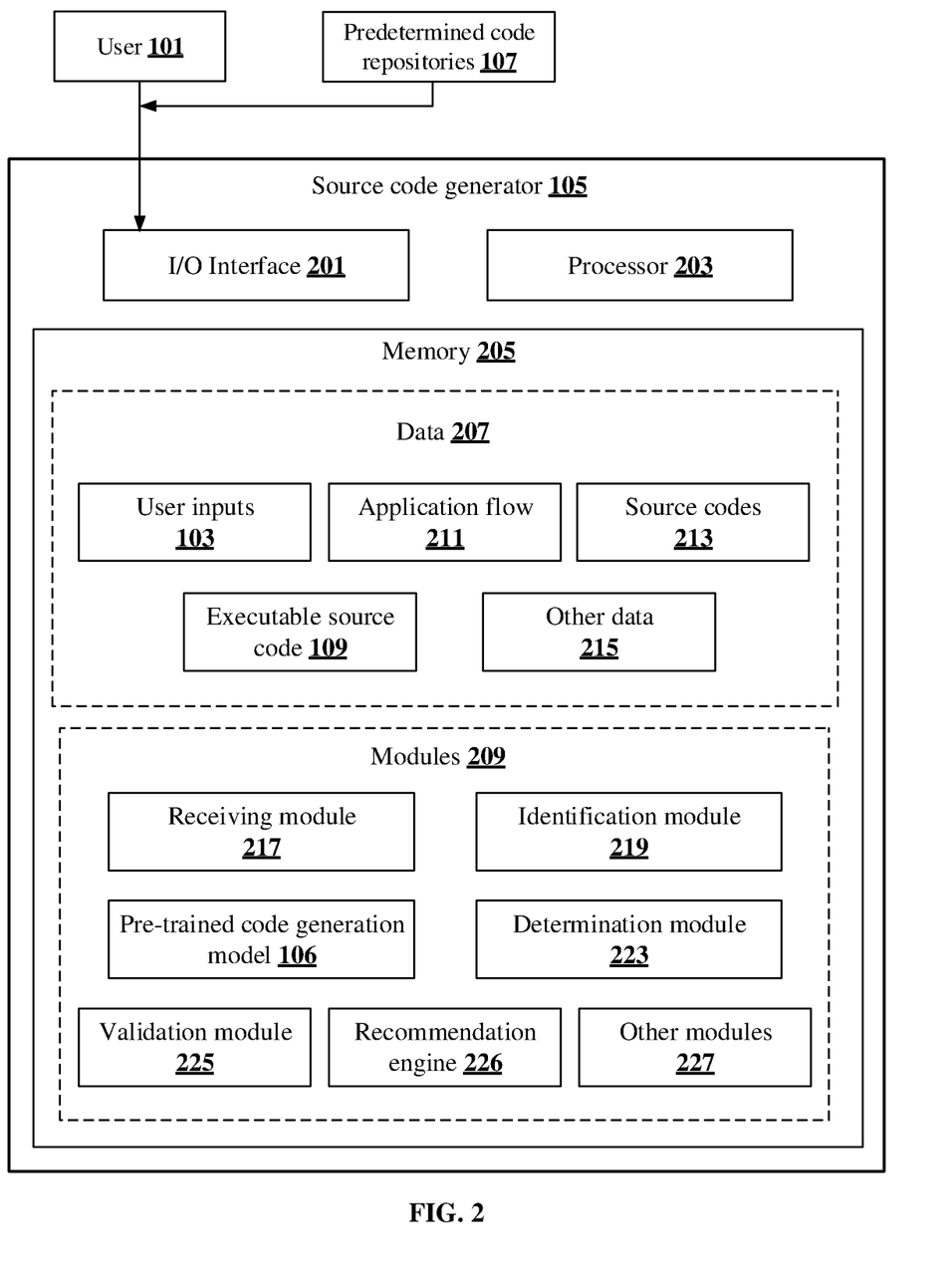
FIG. 2 shows a detailed block diagram of a source code generator in accordance with some embodiments of the present disclosure.

FIG. 2 shows a detailed block diagram of a source code generator 105 in accordance with some embodiments of the present disclosure.

In some implementations, the source code generator 105 may include an I/O interface 201, a processor 203 and a memory 205. The I/O interface 201 may be communicatively interfaced with a user interface associated with a user 101 for receiving user inputs 103 related to requirements of an application from the user 101. Further, the I/O interface 201 may be communicatively interfaced with predetermined code repositories 107 for retrieving one or more source codes 213. The memory 205 may be communicatively coupled to the processor 203 and may store data 207 and one or more modules 209. The processor 203 may be configured to perform one or more functions of the source code generator 105 for dynamically generating an executable source code 109 for an application, using the data 207 and the one or more modules 209.

In an embodiment, the data 207 stored in the memory 205 may include, without limitation, the user inputs 103, an application flow 211, one or more source codes 213, the executable source code 109 (also referred as one or more executable source codes 109) and other data 215. In some implementations, the data 207 may be stored within the memory 205 in the form of various data structures. Additionally, the data 207 may be organized using data models, such as relational or hierarchical data models. The other data 215 may include various temporary data and files generated by the one or more modules 209 while performing various functions of the source code generator 105. As an example, the other data 215 may include, without limitation, one or more reference source codes, historical information related to previously generated one or more executable source codes, abstract syntax tree structure of the one or more source codes 213, multi-dimensional matrix vectors and predefined confidence threshold values.

In an embodiment, the user inputs 103 are the inputs received from the user 101. The user inputs 103 may include user-specific requirements of the application. An exemplary user input 103 may be that the user 101 is asking the source code generator 105 to "Generate an application to start web logic server and start Oracle database". As seen from the above example, the objective and/or the requirements of the application are stated in the user inputs 103. In an embodiment, the user inputs 103 may be received in various forms including, without limitation, as a written description or as an oral illustration from the user 101. When the user inputs 103 are received as an oral illustration, it may be converted into corresponding textual description using one of an existing speech-to-text conversion technique.

In an embodiment, the application flow 211 for the application may be identified from the user inputs 103. The application flow 211 may represent an activity flow of the application, which indicates various actions involved in the application and an order of execution and functional relationship among each of the actions. In an embodiment, the application flow 211 may be identified by processing the user inputs 103 and converting them into machine-understandable vector representations. The process of identifying the application flow 211 is further explained in the later sections of the present disclosure.

In an embodiment, the one or more source codes 213 may be the source codes retrieved from the predetermined code repositories 107 associated with the source code generator 105. The one or more source codes 213 may be selected and obtained according to the application flow 211 of the application. In an embodiment, the one or more source codes 213 may be dynamically generated by the at least one pre-trained code generation model 106 configured in the source code generator 105 based on the user inputs 103, the application flow 211 and one or more reference source codes retrieved from the predetermined code repositories 107.

In an embodiment, the executable source code 109 may be the final, ready to execute and/or workable source code for the application. The executable source code 109 may be generated by validating the one or more best-fit source codes and merging the validated one or more best-fit source codes according to the application flow 211 in order to meet all the user-specific application requirements. Here, the one or more best-fit source codes may be merged to generate the one or more executable source codes 109 based on similarities among the one or more best-fit source codes and predetermined curation rules which are illustrated in the later sections of the disclosure. In an embodiment, before providing the executable source code 109 as an outcome/result to the user 101, the source code generator 105 may be built and compiled the executable source code 109 to ensure that the executable source code 109 is error-free and meets all the user-specific requirements of the application.

In an embodiment, the data 207 may be processed by the one or more modules 209 of the source code generator 105. In some implementations, the one or more modules 209 may be communicatively coupled to the processor 203 for performing one or more functions of the source code generator 105. In an implementation, the one or more modules 209 may include, without limiting to, a receiving module 217, an identification module 219, a pre-trained code generation model 106, a determination module 223, a validation module 225, a recommendation engine 226 and other modules 227.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units.

In an embodiment, the other modules 227 may be used to perform various miscellaneous functionalities of the source code generator 105. It will be appreciated that such one or more modules 209 may be represented as a single module or a combination of different modules.

In an embodiment, the receiving module 217 may be configured for receiving the user inputs 103 from the user 101. Further, the receiving module 217 may be also configured for retrieving the one or more source codes 213 from the predetermined code repositories 107. In an embodiment, the receiving module 217 may be also configured for processing the user inputs 103 using one or more sub-modules configured in the receiving module 217. For instance, the receiving module 217 may perform one or more data cleansing operations on the user inputs 103 and the one or more source codes 213 to eliminate redundant phrases, functions and declarations.

Figure 3A:
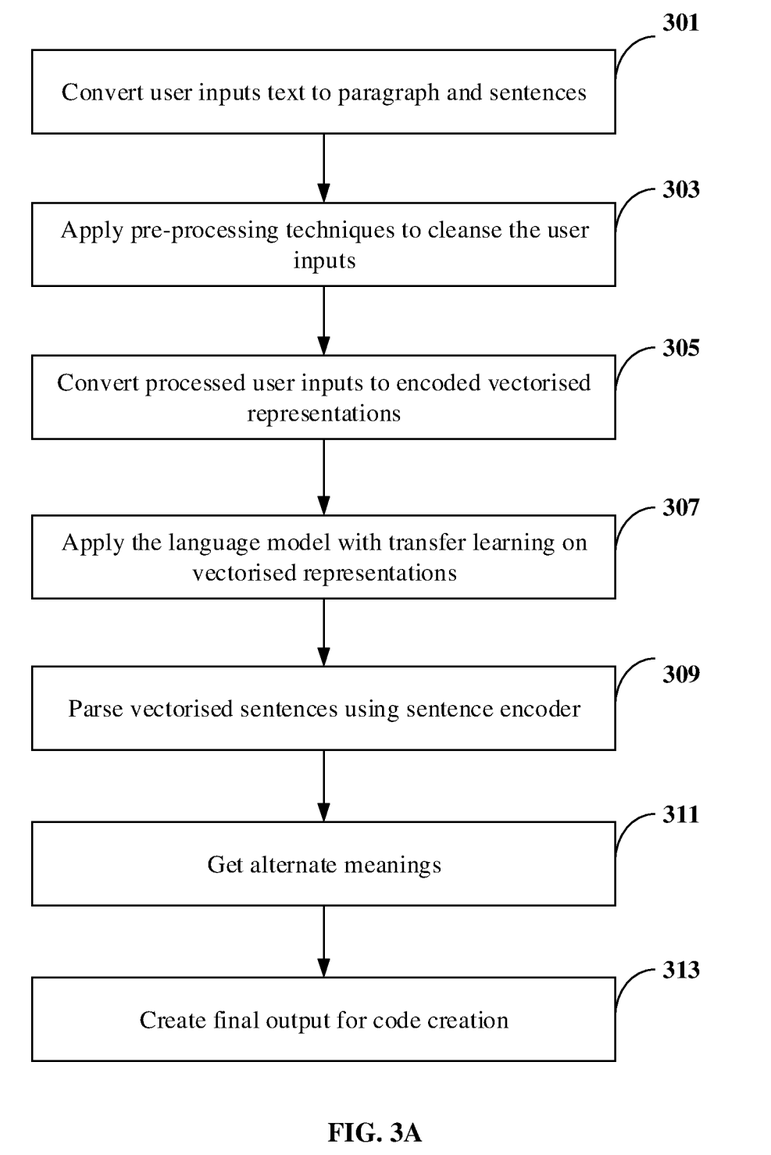
FIG. 3A shows a flowchart illustrating a method of generating application flow from user inputs in accordance with some embodiments of the present disclosure.

In an embodiment, the identification module 219 may be configured for identifying an application flow 211 corresponding to the application based on the user inputs 103. For instance, the process of identifying and generating the application flow 211 is illustrated in FIG. 3A. In an embodiment, the user inputs 103 received from the user 101 may comprise several paragraphs of sentences and/or requirements. For example, a sample user input 103 may comprise two paragraphs, each paragraph having two sentences as shown below:

Start web logic server. Check if the server is up.
Start oracle database. Check if the database is up . . . . (1)

In an embodiment, for generating the application flow 211, the identification module 219 may first go through the user inputs 103 to identify "new line" delimiter to identify the paragraphs in the user inputs 103, as shown in step 301 of FIG. 3A. Further, the paragraphs may be split into sentences using delimiters. Thereafter, as shown in step 303, each sentence in the paragraphs may be pre-processed using predetermined text preprocessing techniques to cleanse the text in the user inputs 103. Further, each sentence in the cleansed user inputs 103 may be analyzed to identify verbs, nouns, adjectives, adverbs and tenses, using predefined language dictionaries configured with the source code generator 105. After the analysis, the user inputs 103 illustrated above in step (1) may be converted as following sentences:

Start web logic server. Check server up.
Start oracle database. Check database up . . . . (2)

Thereafter, the analyzed and/or processed user inputs 103 may be converted to encoded vector representations, as indicated in step 305. This is performed by initially splitting each sentence in the analyzed user inputs 103 into words and grouping together one or more related words. For example, in the analyzed user inputs 103 of step (2), the sentences "Start web logic server" and "Start oracle database" may be grouped as [Start, web logic server] and [Start, oracle database]. Thereafter, a word count logic may be applied to count the number of grouped words in each sentence. As an example, following word count metrics may be obtained from the analyzed user inputs 103 of step (2).

| Sentences | Start | web logic | server | database | check | up | oracle |
|---|---|---|---|---|---|---|---|
| Start web logic server | 1 | 1 | 1 | 0 | 0 | 0 | 0 |
| Check server up | 0 | 0 | 1 | 0 | 1 | 1 | 0 |
| Start oracle database | 1 | 0 | 0 | 1 | 0 | 0 | 1 |
| Check database up | 0 | 0 | 0 | 1 | 1 | 1 | 0 |
| Total | 2 | 1 | 2 | 2 | 2 | 2 | 1 |

In an embodiment, after obtaining the word count, a predefined information retrieval scheme such as Term Frequency—Inverse Document Frequency (TF-IDF) may be applied on each sentence in the following manner—

$$W_{t,d}=TF_{t,d}\log(N/DF_t) \quad (3)$$

Wherein,

"$TF_{t,d}$" represents the number of occurrences of a word "t" in a current document "d". For example, the word "start" occurs in two sentences "start web logic server" and "start oracle database" in the above user inputs 103.

"$DF_t$" represents the number of sentences containing the term "t".

"N" represents the total number of sentences in the user inputs 103.

In an embodiment, upon retrieving the required information from the user inputs 103 using the equation (3), the identification module 219 may apply a predetermined language model on the retrieved information, i.e., word count matrix and convert the matrix into an array of neurons using standard frameworks such as, without limitation, TensorFlow® or PyTorch®, as indicated in step 307.

In an embodiment, as indicated in step 309, the vectorized sentences obtained using the language models may be parsed using sentence encoders to determine the required application flow 211. Initially, the vectorized sentences may be analyzed through a predetermined generalization function such as Softmax function to get alternate meanings for the keywords in the sentences. Further, a global dictionary of synonyms may be derived using unique custom dictionary. Thereafter, each of the word vectors may be passed to the global dictionary for identifying all the synonyms of the word vectors, as indicated in step 311. For example, the word "Restart", "Start", "Reboot" may be considered as synonyms. Further, at step 313, a final output for code creation may be created and all the synonyms identified may be stored in similar vector matrix format for easily recognizing various functions involved in the application flow 211.

In an embodiment, the pre-trained code generation model 106 may be configured for generating the one or more source codes 213 for the application flow 211 using the at least one pre-trained code generation model 106 configured in the source code generator 105. In an embodiment, the vectorized form of the user inputs 103, obtained by the identification module 219, may be passed to the pre-trained code generation model 106. As an example, the vectorized user inputs 103 may be passed to the pre-trained code generation model 106 in the following manner:

$$\{ \quad (4)$$

Technology: Java Function: [Resume, Start, Restart]

[Application Server: Web logic]

}

The above information may be used to search and retrieve any source matching codes that are already available in the database. If the matching source code is available, the vectorized representation may be converted into respective code snippets. However, if the matching source code is not available, then the information may be further passed on to the pre-trained code generation model 106 to predict and generate the required source code.

In an embodiment, after receiving the vectorized input, the pre-trained code generation model 106 may pass the vectorized input to a multi-task learning sub-model, which segregates the task among at least three sub models in the pre-trained code generation model 106. As an example, the sub models comprised in the pre-trained code generation model 106 may include, without limitation, a technology learning model (including information portal codes), an issue resolution model (including issue resolution portal codes) and a code creation model (including codes from the predetermined code repositories 107).

In an embodiment, each sub model in the pre-trained code generation model 106 may use the vectorized representation and pass the same on to an auto encoder network associated with the pre-trained code generation model 106. The auto encoder network may be pre-trained to accept the vectorized words and provide alternate code commands As an example, consider that the auto encoder model has been trained using following inputs:

| | |
|---|---|
| open a file | File x = new filename("file.txt") |
| scan and read opened file | scanner myReader = new Scanner (File) |
| loop | while |
| search pattern | [abc] |
| special character | Pattern.LITERAL |
| close file | File.close |

In an embodiment, during actual prediction for the required source code, a user input 103 such as "How to read file contents in a text file using java language and identify a pattern and take care there are no non-relevant values" may be converted into following contextual representation of the input:

Technology is Java

Open a file

File is text file

Go through content

Content is a file hence loop through each line

Identify pattern

No irrelevant values

Always close file once read

Thereafter, the above contextual representation may be converted to a number metrics or vectors as explained in the earlier steps. Here, for all the vectors that the auto encoder model is already trained for, the corresponding codes may be populated in a vector format as the mode understands such codes with a confidence of 100%. Alternatively, for all the vectors, for which the auto encoder is not trained enough, the model may check for the alternate meanings. Further, for the vectors that the auto encoder is never trained before, the model may not retrieve any code corresponding to such vectors. In an embodiment, a confidence score for the pre-trained code generation model 106 may be determined using the equation (5) below:

$$\text{Confidence score} = \frac{\text{Number of words fully learnt by the auto encoder model}}{(\text{Total number of words} * 100)} \quad (5)$$

In an embodiment, the auto encoder model may have two parts, including an encoder and a decoder. The encoder may get the plain language sentences from the user inputs 103 and pass it to the neurons of the pre-trained code generation model 106, which is already trained on those sentences/words. The decoder may take the sentences and fit it into a learnt code representation for determining the confidence level of the auto encoder model using the equation (5). The above process may be applied for all the sentences in the user inputs 103. Finally, the outcome of the auto encoder model may be consolidated to form a file of multiple code snippets joined together. That is, the output of the auto encoder model may be a source code along with the confidence score of the model. In an alternative embodiment, the confidence score for the model may be calculated based on a probability of the outcome being correct, as measured by the model. This is a measure arrived at by taking into consideration, number of correct occurrences to a total number of occurrences. In an embodiment, if there are no correct occurrences, then the confidence score may be equated to 'zero'.

Figure 3B:
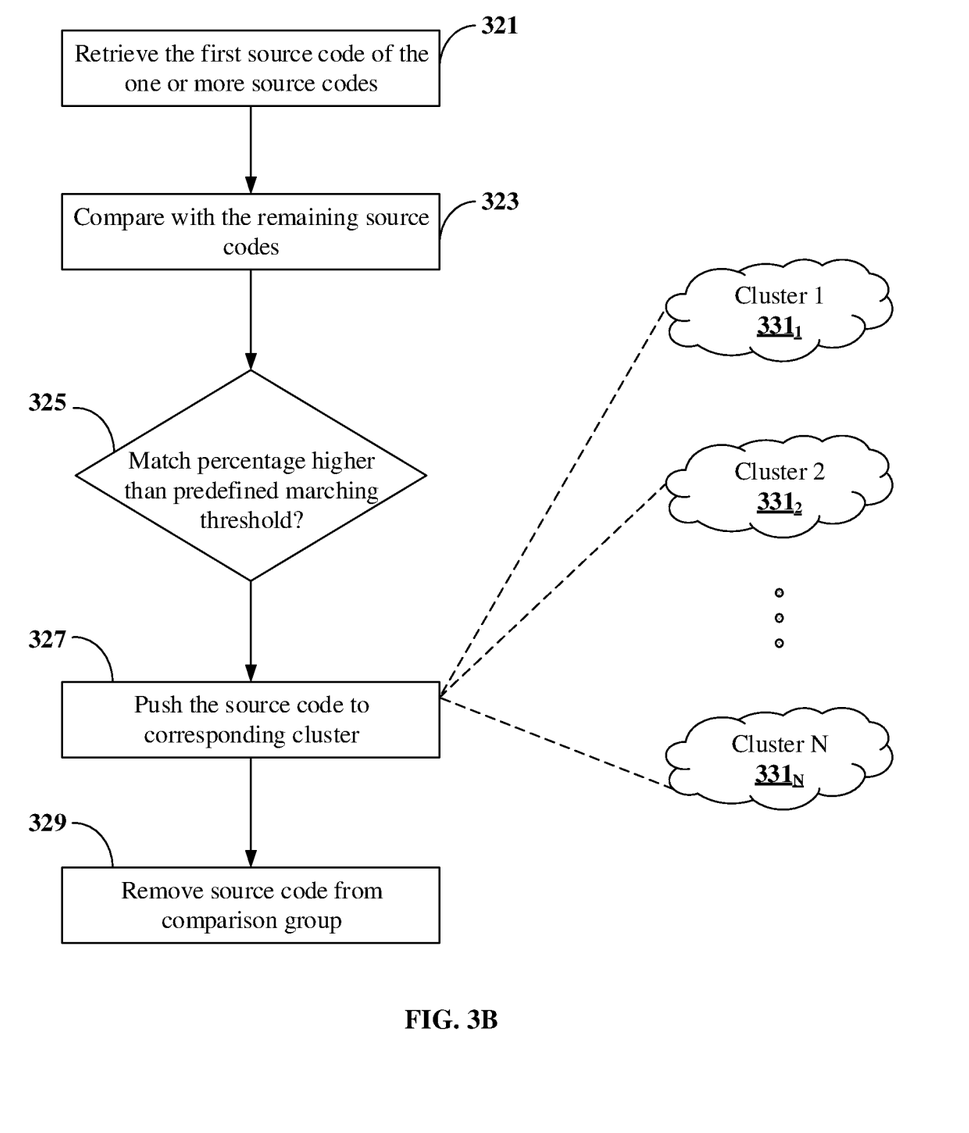
FIG. 3B shows a flowchart illustrating a method of determining best-fit source codes based on similarity among source codes in accordance with some embodiments of the present disclosure.

In an embodiment, the determination module 223 may be configured for determining the one or more best-fit source codes for the application based on similarities among each of the one or more source codes 213. The process of determining similarities among each of the one or more source codes 213 is illustrated in FIG. 3B.

In an embodiment, as indicated in step 321 and 323, each source code in the group of the one or more source codes 213 is retrieved one-by-one and compared against each of the other source codes 213 in the group. Based on the comparison, the similarities among the one or more source codes 213 may be determined using Euclidean distance a Cosine similarity among the one or more source codes 213. In an embodiment, the Euclidean distance between a selected source code and a target source code may be calculated as shown below in equation (6):

$$(x1-x2)^2+(y1-y2)^2 \text{ wherein, } u=(x1, y1) \text{ and } v=(x2, y2) \text{ are two points or values} \quad (6)$$

Similarly, the Cosine similarity is a measure of similarity between two non-zero vectors. In other words, cosine similarity may be determined as the cosine angle between the two vectors. In an embodiment, as indicated in step 325, if the cosine similarity is greater than a predetermined threshold value, the two vectors may be grouped into a single cluster in the group of clusters 331. In an embodiment, the predetermined threshold values may be defined by the user 101. Also, the threshold value may be modified to improve the confidence levels of the outcome.

In an embodiment, the above comparison procedure may be repeated until all the source code in the group are compared against each other and until clustering of each of the one or more source codes 213 is complete as indicated in step 327. After completing the clustering, the one or more source codes 213 in the group of clusters 331 may be returned as the one or more best-fit source codes. The one or more source codes 213 that are not moved to any of the clusters 331, may be removed from the group of the one or more source codes 213 and discarded from further processing, as shown in step 329.

In an embodiment, the validation module 225 may be configured for generating an executable source code 109 for the application after validating the one or more best-fit source codes. In an embodiment, the validation module 225 may validate the one or more best-fit source codes based on predetermined customized rule generators in the source code generator 105. As an example, the validation module 225 may compile and build the best-fit source code using the abstract syntax trees created for each code snippets and perform a code review and code quality and security checks based on the user-specific application requirements across different languages.

In an embodiment, the validation module 225 may build a user-defined 'xpath' rules with quality indicators such as the "TIOBE" community programming index using tools like Programming Mistake Detector (PMD) and SonarQube® to detect bugs, code smells, errors in naming conventions and the like across all the programming languages. In an embodiment, a quality indicator threshold may be used for deciding strictness of the validation process. Also, a unique and predefined static and dynamic application security testing rules may be written for handling dangerous function calls like insecure API calls and memory issues like allocating space for string termination including malicious attacks like SQL® injection attacks.

In an embodiment, the historical information related to the one or more executable codes, obtained from user feedback, review and/or quality rules, along with quality indicators such as TIOBE index, may be used for checking compliance of the selected one or more best-fit source codes. For example, the executable source codes 109 which do not have any predefined critical quality issues and are within a quality indicator threshold may be validated for further processing. Similarly, the executable source codes 109 which do not have any user-defined critical security threats may be successfully validated.

In an embodiment, after successful validation of each of the one or more best-fit source codes using the validation process illustrated above, the validated one or more best-fit source codes may be run through the user-defined rules for code review and quality checks, along with Static Application Security Testing (SAST) and Dynamic Application Security Tests (DAST) tests, including penetration tests to ensure that the critical vulnerabilities related to application security are eliminated. Thereafter, the curated one or more best-fit source codes, which are free of all the vulnerabilities, may be selected as the workable and/or executable source codes 109 for the application.

In an embodiment, after obtaining each of the one or more executable source codes 109 from the validation module 225, the recommendation engine 226 in the source code generator 105 may check if any previous history exists with similar application requirements. If there is a similar instance in the history, the recommendation engine 226 may match the current application requirements partially or fully with the information from the historical instance and assign a weightage to each of the one or more executable source codes 109 based on the matching.

In an embodiment, the weightages may be assigned to those sentences and executable source codes 109, which are frequently retrieved by multiple users and are well accepted previously by the users. The weightages may be computed by adding a specific incremental value to the source code each time the users successfully accept the recommend source code. As an example, the weightages may be determined using the expression of equation (7) below:

$$\text{Weightage=Acceptance score}*100 \quad (7)$$

Wherein,
The "acceptance score" is a ratio of the number of times that the source code is accepted by the users and the number of times the source code was retrieved.

In an embodiment, by calculating the weightages on several iterations, the values of the executable source codes 109 may increase when the same executable source codes 109 are frequently picked up by the users. With the above implementation, the recommendation engine 226 ensures that only the proven and accepted executable source codes 109 are recommended to the user 101.

In an embodiment, after recommending the executable source code 109 to the user 101, the source code generator

105 may collect reviews and feedback from the user 101 on the presented executable source code 109. As an example, the user feedback may be at least one that the user 101 has "fully accepted", "partially accepted" or "not accepted" the given executable source code 109. In case, the user 101 has "fully accepted" the given executable source code 109, the selected executable source code 109 may be fed back to the pre-trained code generation model 106 as an input to reinforcement learning of the pre-trained code generation model 106. Also, the pre-trained code generation model 106 may consider this instance as a "reward" and learn to recommend similar executable source codes 109 for similar application requirements.

On the other hand, if the given executable source code 109 is "partially accepted" by the user 101, then the partially accepted part of the source code may be passed to the pre-trained code generation model 106 for the reinforcement learning and to learn the mistake. Also, a penalty may be assigned to the pre-trained code generation model 106, so that the pre-trained code generation model 106 ensures not to retrieve same or similar executable source codes 109 for the similar application requirements. Similar learning strategy is followed when the user feedback is "not accepted".

Figure 4:
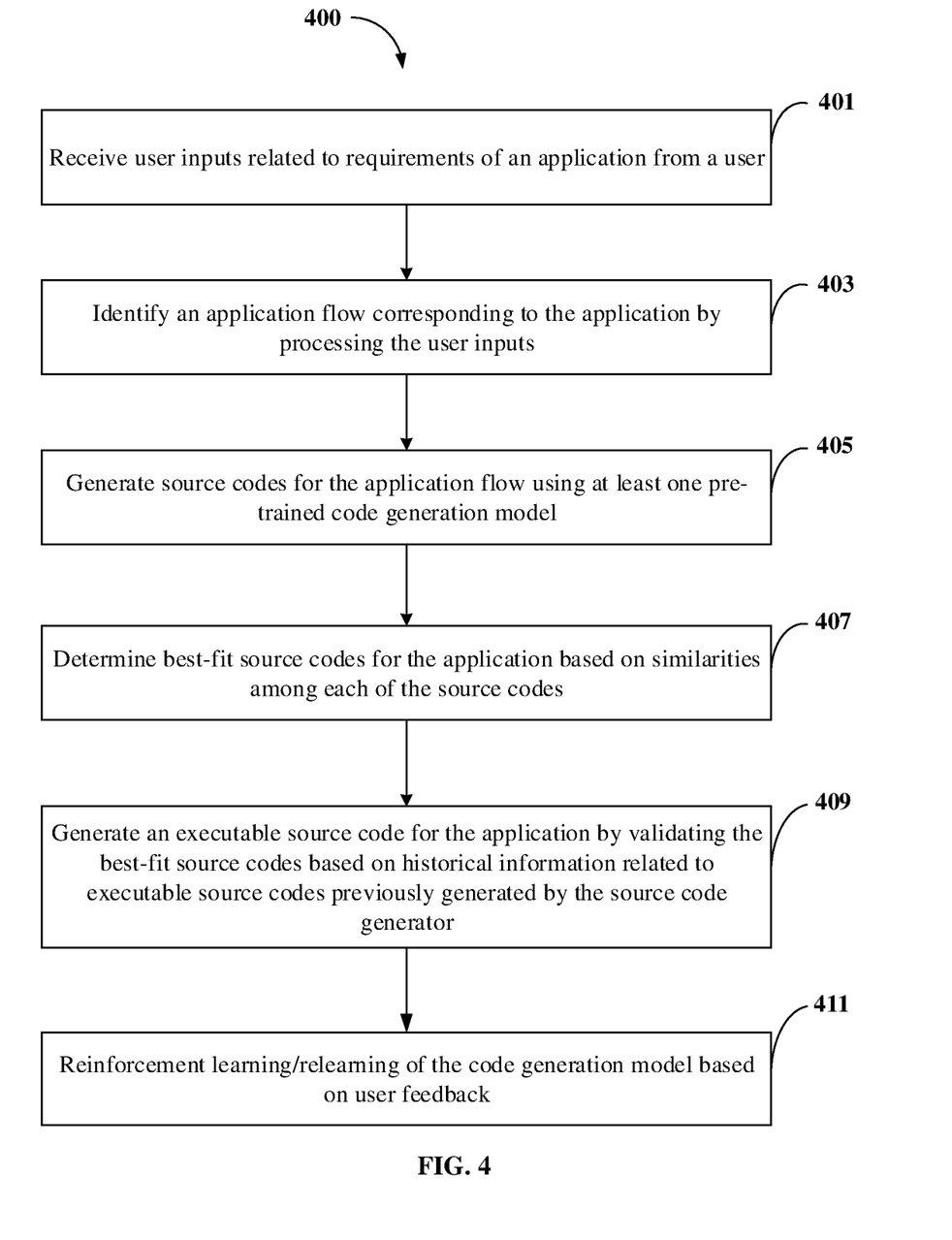
FIG. 4 shows a flowchart illustrating a method of dynamically generating an executable source code for an application in accordance with some embodiments of the present disclosure.

FIG. 4 shows a flowchart illustrating a method of dynamically generating an executable source code 109 for an application in accordance with some embodiments of the present disclosure.

As illustrated in FIG. 4, the method 400 may include one or more blocks illustrating a method for dynamically generating an executable source code 109 for an application using a source code generator 105 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the method 400 includes receiving, by the source code generator 105, user inputs 103 related to requirements of an application from a user 101. In an embodiment, the user inputs 103 on the application requirements may be received in various forms including, without limitation, a written description, oral illustration and the like.

At block 403, the method 400 includes identifying, by the source code generator 105, an application flow 211 corresponding to the application by processing the user inputs 103. In an embodiment, identifying the application flow 211 comprise performing one or more pre-processing operations on the user inputs 103. After performing the pre-processing operations, the pre-processed user inputs 103 may be converted into an encoded vector representation. Thereafter, the encoded vector representation may be encoded using a pre-trained sentence encoder model.

At block 405, the method 400 includes generating, by the source code generator 105, one or more source codes 213 for the application flow 211 using at least one pre-trained code generation model 106. In an embodiment, the at least one pre-trained code generation model 106 may generate the one or more source codes 213 based on the user inputs 103, and one or more reference source codes retrieved from predetermined code repositories 107. As an example, the predetermined code repositories 107 may include, without limitation, at least one of a public source code repository, a private source code repository, a public issue repository, a private issue repository, information portals, or learning systems.

In an embodiment, generating the one or more source codes 213 for the application flow 211 may comprise comparing vector representation of the application flow 211 with one or more vector representations corresponding to the one or more source codes 213. Subsequently, a confidence level for each pair of the vector representation may be determined based on the comparison. Finally, the one or more source codes 213 for the application flow 211 may be generated by combining the one or more source codes 213 corresponding to the vector representation having the confidence level higher than a predefined confidence threshold.

At block 407, the method 400 includes determining, by the source code generator 105, one or more best-fit source codes for the application based on similarities among each of the one or more source codes 213. In an embodiment, determining the one or more best-fit source codes for the application may comprise comparing each source code with each of the one or more source codes 213 for determining similarities among each of the one or more source codes 213. Further to comparison, the one or more source codes 213, whose matching percentage is higher than a predetermined matching threshold, may be clustered into one or more clusters based on the comparison. Finally, the one or more source codes 213 in the one or more clusters may be selected as the one or more best-fit source codes for the application.

In an embodiment, selection of the one or more source codes 213 in the one or more clusters may be performed based on at least one of a ranking associated with each of the one or more source codes 213 or a level of match between results obtained by compiling the one or more source codes 213 and results expected by the user 101. For example, the ranking may be determined based on whether the user 101 has accepted the one or more source codes 213 recommended by the source code generator 105 in the previous instances.

At block 409, the method 400 includes generating, by the source code generator 105, an executable source code 109 for the application by validating the one or more best-fit source codes based on historical information related to one or more executable source codes previously generated by the source code generator 105. In an embodiment, generating the executable source code 109 may comprise compiling each of the one or more best-fit source codes based on the abstract syntax tree structure corresponding to the application flow 211, user 101 defined rules, language-specific testing rules, and quality indicators and then selecting the one or more best-fit source codes as the executable source code 109 upon successful compilation.

In an embodiment, the one or more best-fit source codes may be validated based on weightages associated with each of the one or more best-fit source codes. As an example, the weightages for each of the one or more best-fit source codes may be computed based on number of times that each of the one or more best-fit source codes are previously accepted by the user 101. In an embodiment, the source code generator 105 may collect the user feedback indicating a complete acceptance, partial acceptance or rejection of the executable source code 109 by the user 101, and use the collected user feedback for training a recommendation model used for validating the one or more best-fit source codes.

In an embodiment, the at least one pre-trained code generation model 106 may be trained by classifying the one or more reference source codes, retrieved from the predetermined repositories, as source code functions and text labels after pre-processing the one or more reference source codes. Further to classification, the source code functions may be converted into an abstract syntax tree structure. Thereafter, a multi-dimensional matrix vector corresponding to the source code functions may be generated based on the abstract syntax tree structure. Finally, the at least one pre-trained code generation model 106 may be trained based on the multi-dimensional matrix vector. In an embodiment, the at least one pre-trained code generation model 106 may include, without limitation, a technology learning model, an issue resolution model and a code creation model.

In an embodiment, the technology learning model (or an information portal code) may use the one or more source codes 213 and the descriptions of the one or more source codes 213 to train the technology learning model and to learn each code and its representations. In an embodiment, the issue resolution model may use code snippets corresponding to various issue description for learning the code and its representations. In an embodiment, the code creation model may use the description from technology websites and its code and/or command representations to learn using Generative adversarial networks (GAN) representations.

Finally, as indicated in block 411 of the method 400, the code generation model 106 of the source code generator 105 may undergo a reinforcement learning and/or relearning based on the user feedback on the executable source code 109.

Computer System

Figure 5:
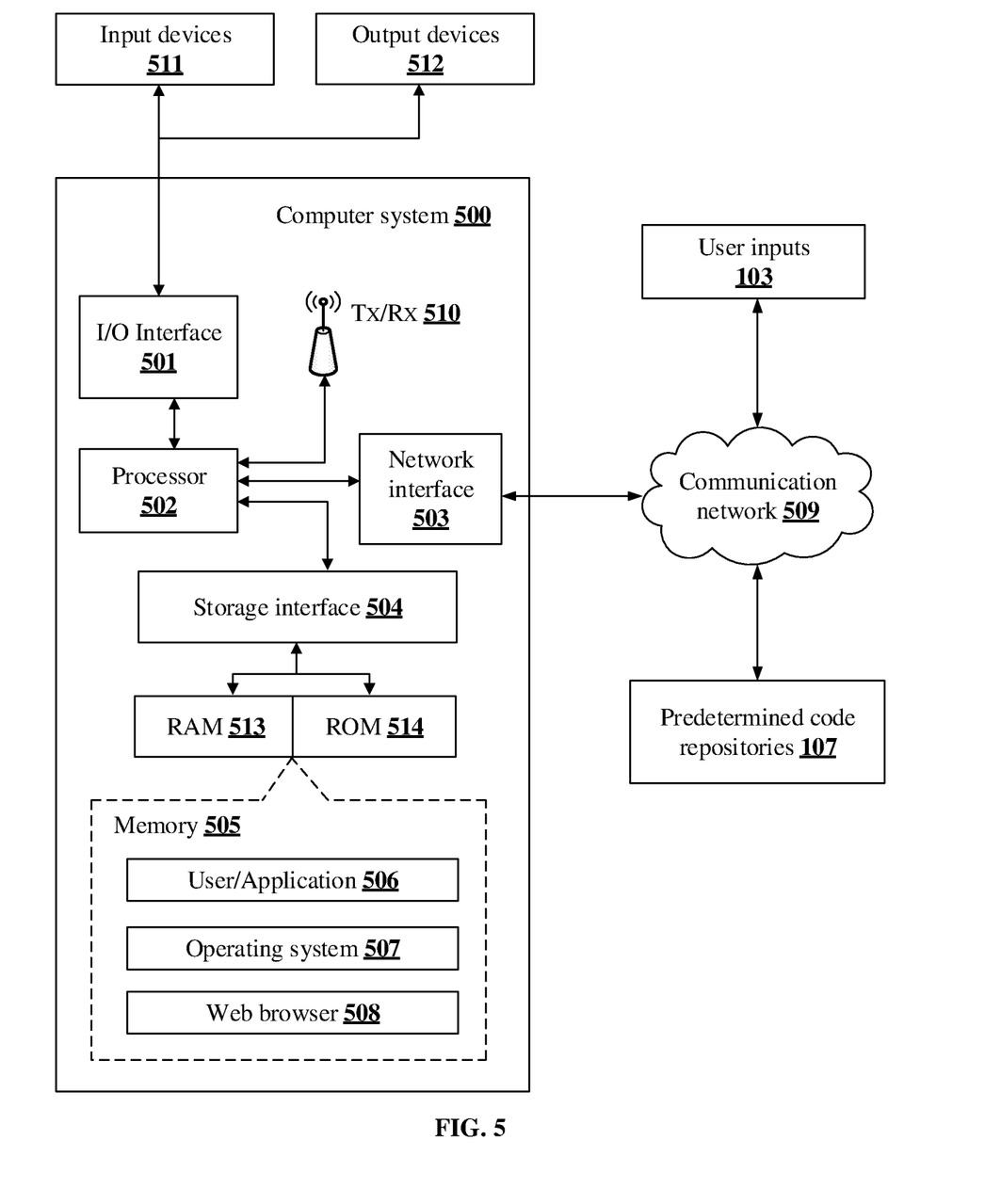
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the source code generator 105 illustrated in FIG. 1, which may be used for dynamically generating an executable source code 109 for an application. The computer system 500 may include a central processing unit ("CPU" or "processor") 502. The processor 502 may comprise at least one data processor for executing program components for executing user- or system-generated business processes. A user may include an application developer, a programmer, an organization or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may connect with a user interface associated with the user 101 for receiving user inputs 103 related to requirements of an application. Further, the computer system 500 may be configured to communicate with predetermined code repositories 107 for retrieving one or more source codes 213 relevant to the user inputs 103. Also, the processor 502 may be disposed in communication with a transceiver (Tx/Rx) 510.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the present disclosure provides a method for automatically generating an executable source code for an application based on application requirements of a user.

In an embodiment, the trained code generation model disclosed in the present disclosure is capable of generating executable codes in multiple technologies and/or programming languages, and thereby makes migration of applications or projects easier and quicker. Also, this helps an organization to reduce number of developers required for a project since technology-specific skilled developers are not required.

In an embodiment, the method of present disclosure ensures standardized outcome across nboards and/or operating locations for an organization while working on common projects.

In an embodiment, the method of present disclosure helps the developers to reduce the ramp-up time during an application development, as the developers can use the automatically generated working application code and add minor tweaks and/or quick fixes to finalize the application code.

Additionally, the method of present disclosure may be used for conversion or migration of existing application codes to other technologies/languages, as the proposed model supports generation of similar codes in multiple technologies/languages.

Further, the method of present disclosure acts as a one-stop solution for solution providers and business users since the proposed model can generate a working application code merely from the application requirements.

As stated above, it shall be noted that the method and the code generator disclosed in the present disclosure may be used to overcome various technical problems related to automated source code generation. Specifically, the method and the code generator disclosed herein aim to reduce overall time and manual efforts required for developing an application. In other words, the disclosed method and the code generator have a practical application and provide a technically advanced solution to the technical problems associated with the existing automated code generation mechanisms.

The aforesaid technical advancement and practical application of the proposed method may be attributed to the aspects of a) generating source codes using a pre-trained code generation model and b) generating an executable source code by validating best-fit source codes selected from the previously generated source codes, as disclosed in steps 3-5 of the independent claims 1 and 11 of the present disclosure.

In light of the technical advancements provided by the disclosed method and code generator, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of dynamically generating an executable source code for an application, the method comprising:
    receiving, by a source code generator, user inputs related to requirements of an application from a user;
    identifying, by the source code generator, an application flow corresponding to the application by processing the user inputs;
    generating, by the source code generator, one or more source codes for the application flow using at least one pre-trained code generation model, wherein the at least one pre-trained code generation model generates the one or more source codes based on the user inputs, and one or more reference source codes retrieved from predetermined code repositories, wherein the at least one pre-trained code generation model is obtained by training a code generation model by performing:
        classifying the one or more reference source codes, retrieved from the predetermined code repositories, as source code functions and text labels after pre-processing the one or more reference source codes;
        converting the source code functions into an abstract syntax tree structure;
        generating a multi-dimensional matrix vector corresponding to the source code functions, based on the abstract syntax tree structure; and
        training the code generation model based on the multi-dimensional matrix vector for obtaining the at least one pre-trained code generation model,
        wherein the at least one pre-trained code generation model comprises a technology learning model, an issue resolution model and a code creation model;
    determining, by the source code generator, one or more best-fit source codes for the application based on similarities among each of the one or more source codes; and
    generating, by the source code generator, an executable source code for the application by validating the one or more best-fit source codes based on historical information related to one or more executable source codes previously generated by the source code generator.

2. The method as claimed in claim 1, wherein identifying the application flow comprises:
    performing one or more pre-processing operations on the user inputs;
    converting pre-processed user inputs into an encoded vector representation; and
    processing the encoded vector representation using a pre-trained sentence encoder model.

3. The method as claimed in claim 1, wherein the predetermined code repositories comprises at least one of a public source code repository, a private source code repository, a public issue repository, a private issue repository, information portals, or learning systems.

4. The method as claimed in claim 1, wherein generating the one or more source codes for the application flow comprises:
    comparing vector representation of the application flow with one or more vector representations corresponding to one or more stored source codes;
    determining a confidence level for each pair of the vector representation based on comparison; and
    generating the one or more source codes for the application flow by combining the one or more stored source codes corresponding to the vector representation having the confidence level higher than a predefined confidence threshold.

5. The method as claimed in claim 1, wherein determining the one or more best-fit source codes for the application comprises:
    comparing each source code with each of the one or more source codes for determining similarities among each of the one or more source codes;
    clustering the one or more source codes, whose matching percentage is higher than a predetermined matching threshold, into one or more clusters based on the comparison; and
    selecting the one or more source codes in the one or more clusters as the one or more best-fit source codes for the application.

6. The method as claimed in claim 5, wherein selecting the one or more source codes in the one or more clusters is based on at least one of:
    a ranking associated with each of the one or more source codes, wherein the ranking is determined based on whether the user has accepted the one or more source codes previously; and
    a level of match between results obtained by compiling the one or more source codes and results expected by the user.

7. The method as claimed in claim 1, wherein generating the executable source code comprises:
    compiling each of the one or more best-fit source codes based on abstract syntax tree structure corresponding to the application flow, user defined rules, language-specific testing rules, and quality indicators; and
    selecting the one or more best-fit source codes as the executable source code upon successful compilation.

8. The method as claimed in claim 1, wherein validating the one or more best-fit source codes is based on weightages associated with each of the one or more best-fit source codes, wherein the weightages for each of the one or more best-fit source codes is computed based on number of times that each of the one or more best-fit source codes are historically accepted by the user.

9. The method as claimed in claim 1 further comprises collecting user feedback indicating a complete acceptance, a partial acceptance, or a rejection of the executable source code by the user, and using the user feedback for training a recommendation model used for validating the one or more best-fit source codes.

10. A source code generator for dynamically generating an executable source code for an application, the source code generator comprising:
 a processor; and
 a memory, communicatively coupled to the processor, wherein the memory stores processor-executable instructions, which on execution, cause the processor to:
  receive user inputs related to requirements of an application from a user;
  identify an application flow corresponding to the application by processing the user inputs;
  generate one or more source codes for the application flow using at least one pre-trained code generation model, wherein the at least one pre-trained code generation model generates the one or more source codes based on the user inputs, and one or more reference source codes retrieved from predetermined code repositories, wherein the processor is further configured to train a code generation model to obtain the at least one pre-trained code generation model by:
   classifying the one or more reference source codes, retrieved from the predetermined code repositories, as source code functions and text labels after pre-processing the one or more reference source codes;
   converting the source code functions into an abstract syntax tree structure;
   generating a multi-dimensional matrix vector corresponding to the source code functions, based on the abstract syntax tree structure; and
   training the code generation model based on the multi-dimensional matrix vector for obtaining the at least one pre-trained code generation model,
   wherein the at least one pre-trained code generation model comprises a technology learning model, an issue resolution model and a code creation model;
  determine one or more best-fit source codes for the application based on similarities among each of the one or more source codes; and
  generate an executable source code for the application by validating the one or more best-fit source codes based on historical information related to one or more executable source codes previously generated by the source code generator.

11. The source code generator as claimed in claim 10, wherein the processor identifies the application flow by:
 performing one or more pre-processing operations on the user inputs;
 converting pre-processed user inputs into an encoded vector representation; and
 processing the encoded vector representation using a pre-trained sentence encoder model.

12. The source code generator as claimed in claim 10, wherein the processor generates the one or more source codes for the application flow by:
 comparing vector representation of the application flow with one or more vector representations corresponding to one or more stored source codes;
 determining a confidence level for each pair of the vector representation based on comparison; and
 generating the one or more source codes for the application flow by combining the one or more stored source codes corresponding to the vector representation having the confidence level higher than a predefined confidence threshold.

13. The source code generator as claimed in claim 10, wherein the processor determines the one or more best-fit source codes for the application by:
 comparing each source code with each of the one or more source codes for determining similarities among each of the one or more source codes;
 clustering the one or more source codes, whose matching percentage is higher than a predetermined matching threshold, into one or more clusters based on the comparison; and
 selecting the one or more source codes in the one or more clusters as the one or more best-fit source codes for the application.

14. The source code generator as claimed in claim 13, wherein the processor selects the one or more source codes in the one or more clusters based on at least one of:
 a ranking associated with each of the one or more source codes, wherein the ranking is determined based on whether the user has accepted the one or more source codes previously; and
 a level of match between results obtained by compiling the one or more source codes and results expected by the user.

15. The source code generator as claimed in claim 10, wherein the processor generates the executable source code by:
 compiling each of the one or more best-fit source codes based on abstract syntax tree structure corresponding to the application flow, user defined rules, language-specific testing rules, and quality indicators; and
 selecting the one or more best-fit source codes as the executable source code upon successful compilation.

16. The source code generator as claimed in claim 10, wherein the processor validates the one or more best-fit source codes based on weightages associated with each of the one or more best-fit source codes, wherein the weightages for each of the one or more best-fit source codes is computed based on number of times that each of the one or more best-fit source codes are historically accepted by the user.

17. The source code generator as claimed in claim 10, wherein the processor is further configured to collect user feedback indicating a complete acceptance, a partial acceptance or a rejection of the executable source code by the user, and training a recommendation model used for validating the one or more best-fit source codes using the user feedback.

18. A non-transitory computer readable medium including instructions stored thereon that when processed by at least one processor cause a source code generator to perform operations comprising:
 receiving user inputs related to requirements of an application from a user;
 identifying an application flow corresponding to the application by processing the user inputs;
 generating one or more source codes for the application flow using at least one pre-trained code generation model, wherein the at least one pre-trained code generation model generates the one or more source codes based on the user inputs, and one or more reference source codes retrieved from predetermined code repositories, wherein the at least one pre-trained code generation model is obtained by training a code generation model by performing:

classifying the one or more reference source codes, retrieved from the predetermined code repositories, as source code functions and text labels after pre-processing the one or more reference source codes;

converting the source code functions into an abstract syntax tree structure;

generating a multi-dimensional matrix vector corresponding to the source code functions, based on the abstract syntax tree structure; and training the code generation model based on the multi-dimensional matrix vector for obtaining the at least one pre-trained code generation model, wherein the at least one pre-trained code generation model comprises a technology learning model, an issue resolution model and a code creation model;

determining one or more best-fit source codes for the application based on similarities among each of the one or more source codes; and generating an executable source code for the application by validating the one or more best-fit source codes based on historical information related to one or more executable source codes previously generated by the source code generator.

* * * * *